United States Patent Office 2,911,301
Patented Nov. 3, 1959

2,911,301
PROCESS OF DRYING MILK

William C. Winder and Elwood W. Kielsmeier, Madison, Wis., assignors to Wisconsin Alumni Research Foundation, Madison, Wis., a corporation of Wisconsin No Drawing. Application December 11, 1957
Serial No. 701,993

9 Claims. (Cl. 99—56)

The present invention relates to an improved process for preparing dried whole milk. More specifically the invention is directed to a low-cost, commercially practical process for preparing an improved dried whole milk product which can be readily and rapidly reconstituted (dispersed and dissolved) in water to form a liquid whole milk product of good taste.

Powdered or dried whole milk has been prepared heretofore by employing the more or less conventional spray drying or drum drying processes. In the spray drying process whole milk is first forewarmed by holding at about 175–180° F. for about thirty minutes, or at higher temperatures for shorter times. The milk is next concentrated under vacuum (e.g. at 120–130° F.) to about 35–45 percent solids, and the concentrated or condensed milk is then preheated to about 140° F. and pumped under high pressure to an atomizing head where it is sprayed into swirling hot air. The air inlet temperature is about 325° to 500° F. and the air outlet temperature is about 160° to 170° F. The dry powdered milk product obtained by this process has long been known to be objectionable primarily because (1) it is hard to disperse in water, (2) it tends to be difficultly soluble in water and (3) it is not very palatable as it has a "cooked" taste. The products obtained by the atmospheric drum drying process are more objectionable and are usually only fit for animals (other than humans), as the drum dried milk tastes badly cooked, is denatured during drying and cannot be reconstituted in water to make an acceptable liquid whole milk product. Dried whole milk made by the vacuum drum drying process is known to be superior to the product made with the atmospheric drum drier and inferior to the spray dried product.

Many attempts involving a large expenditure of time and money have been made by various skilled investigators in this art to solve this problem, i.e. to obtain a dry whole milk product which could be readily and rapidly reconstituted (dispersed and dissolved) in water to yield a liquid whole milk product with the desirable characteristics, including the taste of fresh pasteurized whole milk. The use of the well-known freeze-drying process was found to yield an excellent product but the freeze-drying operation was also found to be too costly and to be commercially impractical for use in preparing a conventional relatively inexpensive product such as dried milk. Although this field of investigation, due to the long recognized need for an improved product, has been active research-wise for many years, no one, as far as known, up to the time of our investigations and discoveries leading to the present invention has defined a low-cost, commercially feasible process for obtaining a dried whole milk product characterized by good dispersibility, good solubility and good taste.

During our investigations in this field we found that while dispersibility (the ability of the dried product to disperse in water) and solubility (the ability of the dried product to dissolve in water) were interrelated in the overall reconstitutibility problem, they were nevertheless different in a sense that it was possible, on the one hand, to prepare a product that was readily dispersed in water but relatively insoluble when dispersed in water, and on the other hand, to prepare a product that was not readily dispersed in water but relatively soluble when dispersed in water. Aside from the absence of the objectionable "cooked" taste, the optimum product should be both readily dispersed in water and when dispersed in water readily soluble in the water. During our investigations we also found that when these latter critical characteristics were obtained, that the reconstituted product had the desired good taste.

In our investigations we found that the whole milk shoulde be first pasteurized, homogenized and concentrated to about 30–45 percent solids. The whole milk, for example, can be pasteurized by standard procedures, e.g. 143° F. for 30 minutes or 161° F. for 16 seconds, or about 270° F. for 3–6 seconds. The pasteurized milk can be homogenized by various means, homogenization at 2500 p.s.i. with a single stage homogenizer being an example. Other homogenizing equipment now available and used to homogenize whole milk can also be employed. The pasteurized, homogenized milk can also be concentrated under vacuum as indicated above with reference to the spray drying process. Various temperatures can be employed in this step although it is generally preferred in the present process not to exceed about 122° F. and for most purposes to employ temperatures up to about and not much above 100° F. For most purposes it is preferred to carry out the concentration operation until the condensed milk contains about 35 percent solids. Condensed milk containing more solids, e.g. 50 percent solids, or less solids, e.g. 25 percent solids, can be employed in the process although it is generally not feasible to carry this initial concentration step much beyond the point of about 45 percent solids or use a concentrate containing less than about 30 percent solids in the steps described below.

The steps employed in the pasteurization, homogenization and concentration of the whole milk can be of the conventional type and can be carried out as stated above by well-known means such as those illustrated. The steps employed in the treatment of the resulting pasteurized, homogenized condensed milk are critical as will be apparent from the following. We have discovered, for example, on further drying of the condensed milk to provide for desired reconstitutibility it is first necessary to cool and hold the condensed milk below room temperature to about 50° F. to solidify substantially all of the butter fat and to maintain the temperature of the cooled condensed milk during the drying thereof below about 95° F. (35° C.), the approximate melting point of butter fat, and preferably below 90° F. (32.2° C.), until the solids concentration of the milk is sufficiently high to entrap and prevent migration of the fat. If this is not done the fat melts, apparently moves in the milk (e.g. in wicking-type action for as the solids go above 50% the milk becomes a paste), coats the drying particles with a film of fat, and the resulting mixture floats and at best is difficult to reconstitute in water. The solids concentration necessary to entrap the fat and prevent wicking may vary with different systems but we have discovered that the fat becomes entrapped as the solids concentration approaches 70 percent and is more securely held in place at a solids concentration of about 79 to 80 percent. Thus to provide for ready reconstitutibility of the dried whole milk, the temperature of the cooled condensed milk on further drying should be maintained below 95° F. until the solids concentration reaches 70 percent and preferably below 90° F. until the solids concentration reaches 79 to 80 percent.

The precooling of the condensed milk to 50° F. and preferably to 40° F. (4.5° C.) or below, is necessary to insure that substantially all of the butter fat, which is liquefied during the pasteurizing and condensing operations, is in the solid state at the time heat is applied to dry the condensed milk. It is also necessary that the condensed milk be held at the cool temperature until substantially all of the fat that will solidify at 50° F. is solidified. As butter fat is made up of a mixture of fats this may take from a few minutes (e.g. 4–6 minutes) when the condensed milk is cooled in a thin film to at least an hour when the condensed milk is cooled in a vat. Optimum holding times to insure that substantially all of the fat is in the solified state can be readily ascertained by preliminary test. When substantially all of the fat is in solid form at the start of the drying operation, there is no instantaneous melting of the fat when the temperature of the condensed milk is raised above the point where the fat will ultimately be completely liquid. Starting the drying operation with the cooled condensed milk with substantially all of the fat in solid form thus makes it readily possible to maintain the solid fat in solid form until the solids concentration of the drying milk reaches 70 percent and the fat is entrapped and fat migration or "wicking" thus prevented.

In our investigations, we also discovered on further drying of the condensed milk that desired solubility of the product could not be obtained if the heat exposure of the product exceeded certain critical values. It was found that this heat sensitivity exists primarily while the solids concentration of the milk is in the range of about 35% to about 88%. We have now defined heat exposure in terms of critical time-temperature conditions.

The following Equation I can be used to determine the maximum temperature Y (° C.) to which the product can be heated in drying to a solids concentration of about 87% during a predetermined time X (in minutes). Conversely the equation can be used to determine the maximum time X during which the product can be heated to a maximum temperature Y in drying to a solids concentration of about 87%.

(I)      $Y = 47 - 15.4 \log_{10} X$
(II)      $Y = 39 - 15.4 \log_{10} X$

Product solubility is measured by the standard technique. (Lab. Manual—Methods of Analysis of Milk and Its Products, page 385, published by the Milk Industry Foundation, 1001 15th Street, N.W., Washington 5, D.C.) A solubility index of 0.1 was considered to be satisfactory and can be obtained if heat exposure is less than that determined by Equation I. An index of 0.03 is considered preferable, however. Equation II defines the maximum heat exposure for such a product.

These equations result from data obtained in the equipment in which the milk temperature progressively increased from 0° C. to Y° C. While the milk was being warmed through this range the solids concentration increased from 35% to about 88%.

It is now known that the milk proteins are increasingly temperature sensitive as the solids concentration approaches 87 percent, however, a sensitivity does exist even at 35 percent solids. Because of this difference in sensitivity, it is possible to adopt different temperature profiles, that is time-temperature relationships for the drying process, each of which would produce a satisfactory product. The above equations are applicable for a process where the temperature increases in an almost linear fashion from 0° C. to Y° C. in X minutes. If a process were selected in which the temperature were held at very low levels for a long time and if the rate were then adjusted to provide for drying through the most critical range in a short time an equivalent type equation could be developed by experimental test. Such a new equation would provide for longer times X for any given value of Y than the above equations. Similarly, a process could be selected in which the temperatures were brought to the near maximum value early in the drying period and held for the remainder of the drying through the critical range. The equations for such a process would provide shorter times to achieve a given final temperature Y than the subject equations. It is readily apparent that these different processes would be equivalent in the product produced for in either case the temperature sensitive proteins would be subjected to time-temperature combinations which would result in prevention of protein damage as it relates to solubility.

Should it be desirable to operate a drying system in which the initial product temperature is different than 0° C. or in which the temperature does not increase approximately uniformly with time other equations may be defined by preliminary test. To obtain data for Equations I and II, milk samples were dried to 97.5% solids so that solubility indices could be measured. However, several samples were taken from each batch so that curves of percent solids and product temperature versus time could be drawn. From such data, the equations were derived in a manner described in the Ph. D. thesis of Elwood Kielsmeier filed in the University of Wisconsin Library in August 1956.

The following table gives illustrative approximate times and temperatures called for by the above equations.

TABLE

| Time in Minutes (X) | Temperature in Degrees Centigrade (Y) When Calculated From: | |
| --- | --- | --- |
| | $Y = 39 - 15.4 \times \log_{10} X$ | $Y = 47 - 15.4 \times \log_{10} X$ |
| 0.005 | 74 | 82 |
| 0.010 | 70 | 78 |
| 0.030 | 62 | 70 |
| 0.060 | 58 | 66 |
| 0.120 | 53 | 61 |
| 0.250 | 48 | 56 |
| 0.500 | 44 | 52 |
| 1.000 | 39 | 47 |
| 1.500 | 36 | 44 |
| 2.000 | 34 | 42 |
| 3.000 | 32 | 40 |
| 4.000 | 30 | 38 |
| 5.000 | 28 | 36 |
| 10.00 | 24 | 32 |
| 20.00 | 19 | 27 |
| 30.00 | 16 | 24 |

We have discovered that the above desired characteristics (dispersibility, solubility and good taste) can be readily obained by the present invention illustrated as follows.

*General process*

Pasteurized, homogenized condensed milk of about 30 to 45 percent solids content is cooled to below 50° F. (e.g. 40–45° F.) and held at this temperature until substantially all of the butter fat in the condensed milk is in solid form. The cooled condensed milk with substantially all of the fat in solid form is then subjected to heat and dried until the solids concentration reaches at least about 97 percent. The heat applied to the condensed milk during the drying period is controlled so that the temperature of the milk does not exceed about 95° F. until the solids concentration reaches at least about 70 percent, and the heat exposure is maintained below the values of maximum time or temperature determined by the equation:

$$Y = 47 - 15.4 \log_{10} X$$

(where Y is temperature in degrees centigrade and X is time in minutes) until the solids concentration reaches and exceeds about 87 percent. The process can be illustrated further as follows:

Pasteurized, homogenized, condensed whole milk of about 30 to 45 percent solids is first cooled and held at 50° F. or below until substantially all of the fat is solidified, the cooled milk is then subjected to a starting absolute pressure of about 4.5–25 millimeters of mercury and heat is applied. In most instances, when using low pressures, it is preferred to keep the absolute pressure below 12 millimeters of mercury with 4.6–5.4 absolute pressure in millimeters of mercury being preferred. A large amount of heat can be applied initially and is recommended as the water evaporates from the milk at a more or less constant rate providing relatively low product temperatures until the solids concentration exceeds 50 percent and approaches 70 percent. The heat should be decreased (if a large amount of heat is employed initially) and the temperature controlled to maintain the temperature of the milk below 95° F. (35° C.) until the solids concentration reaches at least about 70 percent. This, as explained above, is required to obtain the desired reconstitutibility. During this period also the temperature is controlled and maintained below the values specified by $Y = 47 - 15.4 \log_{10} X$ (where Y and X represent temperature and time as given above) until the solid content reaches and goes above 87 percent. This, as explained above, is required to obtain the desired rapid solubility. In a practical vacuum drying system where X is 3 minutes, Y is 40° C. (104° F.) and the temperature of the drying milk should not exceed this value until the solids concentration reaches and exceeds 87 percent. During this period also as noted above, the temperature should not exceed 95° F. (35° C.) until the solids concentration reaches at least about 70 percent. After the solids concentration exceeds 87 percent the heat can be increased up to about 200° F. (93.3° C.) with temperatures below 175° F. (80° C.) being preferred, and the final drying continued to yield a product having a solids concentration of about 97 percent or more. The resulting product has the desired dispersibility, solubility and good taste.

Specific process I

A preferred process can be illustrated as follows:
(1) Raw whole milk is pasteurized at about 143° F. (61.7° C.) for 30 minutes.
(2) The pasteurized milk is homogenized at 2500 p.s.i. with a single stage homogenizer.
(3) The pasteurized, homogenized milk is condensed under vacuum to slightly over 35 percent solids at vapor temperatures between 68–77° F. (20–25° C.).
(4) The condensed milk is cooled to 40° F. (4.5° C.), standardized to 35 percent solids by addition of cooled water or cooled pasteurized, homogenized whole milk and held for about 1–2 hours.
(5) The cooled condensed milk with its fat in solid form is dried at an absolute pressure of about 5 millimeters of mercury. A large amount of heat is initially applied as the water evaporates at a more or less constant rate providing relatively low product temperatures. During part of this period, the mixture boils rapidly and remains relatively cool due to loss of water. The heat applied is decreased and controlled to maintain the temperature below about 90° F. (32.2° C.) until the solids concentration reaches about 79–80 percent when a permanent structure is obtained and the fat migration and wicking is minimized. During the entire period starting with a solids concentration of 35 percent until the solids concentration reaches and goes above about 87 percent, the heat exposure is maintained below the values of maximum time or temperature determined by the equation $Y = 39 - 15.4 \log_{10} X$, where Y is temperature in degrees centigrade and X is time in minutes. Where X is between 2–3 minutes Y is about 32–34° C. (about 89.6–93.2° F.) and the temperature of the drying milk should not exceed these values until the solid concentration reaches and exceeds 87 percent. During this period also as noted above the temperature should not exceed 90° F. (32.2° C.) until the solids content reaches about 79–80 percent.

(6) When the solids content reaches and exceeds 87 percent, e.g. 88 percent solids, the temperature is increased to about 149° F. (65° C.) and drying continued under the low pressure until the product has a solids content of about 97.5 percent. The resulting dried product is readily dispersible in water, and, when dispersed, readily soluble in water. It is free, also, from objectionable tastes, e.g. the "cooked" taste normally associated with dried milk. When the dried product is to be stored for relatively long periods of time, cold storage at about 0° to 5° C. aids in preventing flavor deterioration. The dried product also can be quick cooled to 50° F. after the drying operation.

The drying of the condensed milk can be carried out in shallow pans or preferably continuously on a moving belt in a vacuum chamber where the heat can be supplied electrically or by steam or hot water or other means and readily controlled "tailored" or "profiled" for the system as the belt moves through the chamber. For rapid drying the condensed milk should be in the form of thin films, e.g. 0.001–0.06 inch in thickness. In systems operating at different temperatures the optimum conditions may vary slightly from those called for by the equations noted above but can be readily ascertained by preliminary tests. Under the conditions specified excellent dried whole milk products of the type desired have regularly been obtained.

The pressures noted above have been considered as absolute pressures. It is also possible to operate a drying system when the partial pressure of water vapor is equal to the values specified, and where the necessary gradients are achieved by sweeping the system with a relatively dry gas. Under such conditions the total pressure could be the vapor pressure of water up to atmospheric or greater.

The process of the present invention carried out in a spray-drying operation can be illustrated as follows:

Specific Process II

Pasteurized, homogenized, condensed milk of about 30–45 percent solids content is precooled to 40 to 50° F. or lower until substantially all the fat is solidified. The cool milk can be spray dried as is or may be warmed rapidly to about 80 to 90° F. and then pumped immediately under high pressure to an atomizing head where it is sprayed into swirling dry air or dry gas in a drying column. The air inlet temperature is about 225 to 350° F. and the air outlet temperature is about 140 to 170° F. The dried milk can be quickly cooled to 50° F. or below, e.g. with a blast of air, and/or recovered from the bottom of the drying column with cooling, e.g. with a refrigerated or cold plate screw conveyer, or in accordance with standard practices which include cooling in this art. It is important, as indicated above, that the temperature of the condensed milk at the time it is pumped to the atomizing head and atomized be below the melting point of butter fat (i.e. below 95° F. and preferably below 90° F.), and that it be maintained below the melting point of the butter fat during the initial steps of the drying operation until the solids content is such as to entrap the fat and prevent fat migration or "wicking," i.e. until the solids content approaches 70% and preferably 79–80%. The precooling of the concentrated milk to 50° F. or below before pumping to the atomizing head has been found important, as noted above, to solidify the fat and for maintaining the solidified fat in the solid state during the critical period. When substantially all of the fat is in solid form at the start of the drying operation, there is no instantaneous melting of the fat when the temperature of the condensed milk is raised above the point where the fat will ultimately be completely liquid. If the cooled milk is warmed to 80–90° F., it is also important that the milk be warmed rapidly, without delay, and be pumped immediately to the atomizing head. The optimum air inlet and outlet temperatures can vary depending on the temperature of the condensed milk entering the atomizing head and the amount of air and the particular apparatus employed, but can be readily ascertained by preliminary test. For example, if the dried milk obtained is not readily reconstituted in water to form a liquid milk product of good taste, the temperature of the condensed milk or the temperature of the inlet air or both should be altered until a dried product having the desired characteristics is obtained.

In the spray drying operation of the type described above the particles of milk are normally dried in less than one second. During this period the temperature is below the values specified by the equations noted above until the solids content reaches and exceeds 87 percent. This along with maintaining the fat in the solid form until the solids content reaches 70 percent, is important, as noted above, in providing a product which can be readily and rapidly reconstituted (dispersed and dissolved) in water.

The drying operation can be modified and the temperatures profiled so that the atomized milk initially comes into contact with hot air of a relatively low temperature and then contacts hot air in another part of the drying column at a higher temperature when the solids content is above 70% or preferably 79-80%, to complete the removal of water. One of the preferred modifications is to first contact the atomized milk with hot air of relatively high temperature, then hot air of relatively lower temperature and finally hot air of relatively higher temperature. In the first stage of this operation the temperature of the milk although subjected to relatively hot air remains relatively cool due to the rapid loss of water at this time. In the second stage of this operation the relatively low temperature of the air maintains the temperature of the milk below the melting point of the butter fat until the solids content approaches or exceeds 79-80%, e.g. reaches and exceeds 87%, the point at which the proteins are also known to be most sensitive. In the last stage relatively hot air can be used to advantage to complete the drying as the butter fat is securely entrapped and the proteins are not sensitive during this latter stage in the drying operation. Reduced pressures or vacuum can also be employed in the drying tower.

The processes of the present invention as noted above are particularly adaptable for drying whole milk. The process, however, can be used to advantage for drying skim milk or like types of milk containing less fat than present in whole milk.

Regardless of possible theories of operation, it has been fully demonstrated that a readily and rapidly dispersible, highly soluble dried whole milk product of good taste can be prepared when the condensed milk is dried under the conditions specified in our invention. Accordingly, and while some of the explanations noted above are theoretical in nature, it will be understood that the invention is not limited by or restricted to theories of operation.

The present application is a continuation-in-part of our prior application Serial No. 604,071, filed August 15, 1956 now abandoned.

We claim:

1. The process of drying milk which comprises holding pasteurized, homogenized condensed milk containing butter fat at a cooling temperature down to at least 50° F. until substantially all of the fat in the milk is in the solid state, and drying the condensed milk by application of heat to the milk while the fat is still in the solid state, the temperature of the milk in said drying operation being maintained (a) below about 95° F. until the solids content of the drying milk is at least about 70%, and (b) below the values specified by the equation:

$$Y = 47 - 15.4 \log_{10} X$$

where Y is temperature in degrees centigrade and X is time in minutes, until the solids content in the drying milk reaches about 87%.

2. A process in accordance with claim 1 in which pasteurized, homogenized condensed whole milk of about 30-45% solids content and having substantially all of its butter fat in the solid state is subjected to heat at an absolute pressure of about 4.5-25 millimeters of mercury, the temperature of the milk in said drying operation being maintained below about 90° F. until the solids concentration of the drying milk reaches about 79-80%.

3. A process in accordance with claim 1 in which pasteurized, homogenized condensed whole milk of about 30-45% solids content and having substantially all of its butter fat in the solid state is spray dried, the temperature of the milk in said drying operation being maintained below about 90° F. until the solids concentration of the drying milk reaches about 79-80%.

4. A process for preparing dried whole milk which comprises subjecting cooled pasteurized, homogenized condensed milk of about 30-45% solids content and having substantially all of its butter fat in the solid state to heat at an absolute pressure of about 4.5-25 millimeters of mercury, the heat applied to the condensed milk during this period (1) being such that the temperature of the milk does not exceed about 95° F. until the solids concentration reaches at least about 70%, and (2) being such that the temperature of the milk does not exceed the values specified by the equation:

$$Y = 47 - 15.4 \log_{10} X$$

where Y is temperature in degrees centigrade and X is time in minutes, until the solids concentration reaches and exceeds 87%, and thereafter increasing the heat and completing the drying of the milk at temperatures up to 200° F. until the solids concentration reaches at least about 97%.

5. A process for preparing dried whole milk characterized by its ability of being readily and rapidly reconstituted in water to form a liquid whole milk product of good taste, which comprises subjecting cooled pasteurized, homogenized condensed milk of about 35% solids content and having substantially all of its butter fat in the solid state to an absolute pressure below 12 millimeters of mercury, applying a large amount of heat to the condensed milk and maintaining this heat as long as the water evaporates from the milk rapidly and provides low product temperatures, decreasing the heat so as to maintain the temperature of the milk below about 90° F. until the solids concentration reaches about 79-80%, the temperature during this period and up until the solids concentration reaches and exceeds 87% being maintained below the values specified by the equation:

$$Y = 47 - 15.4 \log_{10} X$$

where Y is temperature in degrees centigrade and X is time in minutes, and thereafter increasing the heat and completing the drying of the milk under low pressure at temperatures below about 175° F.

6. A process for drying whole milk which comprises concentrating pasteurized, homogenized whole milk under vacuum at a temperature below 122° F. to a solids concentration of about 35%, cooling the resulting condensed milk to about 40° F. until substantially all of the butter fat is in the solid state, continuing the drying of the cool condensed milk at an absolute pressure of about 5 millimeters of mercury, the heat applied to the cool condensed milk during this period (1) being such that the temperature of the milk does not exceed about 90° F. until the solids concentration is about 79-80%, and (2) being such that the temperature of the milk does not exceed the values specified by the equation:

$$Y = 39 - 15.4 \log_{10} X$$

where Y is temperature in degree centigrade and X is time in minutes, until the solids concentration reaches and exceeds 87%, and thereafter completing the drying of the milk under the low pressure at a temperature of about 149° F. until a product containing about 97.5% solids is obtained.

7. A process of drying milk which comprises cooling pasteurized, homogenized condensed whole milk of about 30-45% solids content to about 40-50° F. until substantially all of the butter fat is solidified, and then spray drying the condensed milk while the fat is still in the solid state, the temperature of the milk in said drying operation being maintained (1) below about 95° F. until the solids concentration of the drying milk is about 70% and (2) below the values specified by the equation:

$$Y = 39 - 15.4 \log_{10} X$$

where Y is temperature in degrees centigrade and X is time in minutes, until the solids concentration reaches and exceeds 87%.

8. The process of claim 7 where the temperature of the drying milk is maintained below about 90° F. until the solids content is about 79-80° F.

9. The process of claim 8 where the condensed milk contains about 35% solids, the cooled milk with substantially all of its fat in the solid state is warmed rapidly to about 80-90° F. and then immediately atomized in swirling dry air with an air inlet temperature of about 225-350° F. and an air outlet temperature of about 140-170° F.

References Cited in the file of this patent

UNITED STATES PATENTS

| | | |
|---|---|---|
| 843,938 | Glas | Feb. 12, 1907 |
| 1,026,756 | McIntyre | May 21, 1912 |
| 2,067,205 | Robison | Jan. 12, 1937 |

FOREIGN PATENTS

| | | |
|---|---|---|
| 6,720 | Great Britain | Nov. 10, 1904 |

OTHER REFERENCES

Herrington: Milk and Milk Processing, 1st ed., New York, 1948, pp. 44-45.

Hunziker: Condensed Milk and Milk Powder, 7th ed., Illinois, 1949, pp. 440-441.